United States Patent
Zhang et al.

(10) Patent No.: US 9,880,770 B2
(45) Date of Patent: Jan. 30, 2018

(54) SUPPORTING INVALIDATION COMMANDS FOR NON-VOLATILE MEMORY

(71) Applicant: SK Hynix Inc., Gyeonggi-do (KR)

(72) Inventors: Fan Zhang, Fremont, CA (US); Taeil Um, San Jose, CA (US); Yu Cai, San Jose, CA (US)

(73) Assignee: SK Hynix Inc., Gyeonggi-do (KR)

( * ) Notice: Subject to any disclaimer, the term of this patent is extended or adjusted under 35 U.S.C. 154(b) by 147 days.

(21) Appl. No.: 15/013,855

(22) Filed: Feb. 2, 2016

(65) Prior Publication Data

US 2017/0060768 A1    Mar. 2, 2017

Related U.S. Application Data

(60) Provisional application No. 62/213,228, filed on Sep. 2, 2015.

(51) Int. Cl.
*G06F 3/06* (2006.01)
*G06F 12/02* (2006.01)

(52) U.S. Cl.
CPC .......... *G06F 3/064* (2013.01); *G06F 3/0619* (2013.01); *G06F 3/0652* (2013.01); *G06F 3/0679* (2013.01); *G06F 12/0246* (2013.01); *G06F 2212/652* (2013.01); *G06F 2212/7207* (2013.01); *G06F 2212/7209* (2013.01)

(58) Field of Classification Search
CPC ...... G06F 3/064; G06F 3/0652; G06F 3/0679; G06F 3/0688; G06F 12/0246; G06F 2212/7201–2212/7211
See application file for complete search history.

(56) References Cited

U.S. PATENT DOCUMENTS

| | | | |
|---|---|---|---|
| 8,407,449 B1 * | 3/2013 | Colon | G06F 12/0246 711/103 |
| 8,904,092 B2 | 12/2014 | Tucek | |
| 8,954,654 B2 | 2/2015 | Yu | |
| 9,053,007 B2 | 6/2015 | Nishikubo | |
| 9,715,447 B2 * | 7/2017 | Lin | G06F 12/0246 |
| 2005/0210218 A1 * | 9/2005 | Hoogterp | G06F 3/0613 711/203 |
| 2010/0217927 A1 * | 8/2010 | Song | G06F 3/0616 711/103 |
| 2012/0110249 A1 * | 5/2012 | Jeong | G06F 3/0616 711/103 |

(Continued)

FOREIGN PATENT DOCUMENTS

JP    2013200688 A    * 10/2013

OTHER PUBLICATIONS

Translation of JP 2013200688 A. Aug. 2017.*

*Primary Examiner* — Nathan Sadler
(74) *Attorney, Agent, or Firm* — Kilpatrick Townsend & Stockton LLP

(57) ABSTRACT

Techniques and systems are provided for tracking commands. Such methods and systems can include maintaining a meta page in a volatile memory to track commands. The meta page can comprise information associated with a non-volatile memory superblock. When an invalidation command is received for a first logical address, the first logical address can be stored along with an indication that the data associated with the first logical address is invalid, in a first location in the meta page.

21 Claims, 10 Drawing Sheets

(56) References Cited

U.S. PATENT DOCUMENTS

| | | | |
|---|---|---|---|
| 2012/0221776 A1* | 8/2012 | Yoshihashi | G06F 12/0804 |
| | | | 711/103 |
| 2013/0132650 A1 | 5/2013 | Choi et al. | |
| 2013/0219106 A1* | 8/2013 | Vogan | G06F 12/0246 |
| | | | 711/103 |
| 2013/0275660 A1* | 10/2013 | Bennett | G06F 12/0292 |
| | | | 711/103 |
| 2014/0095767 A1* | 4/2014 | Trika | G06F 12/0238 |
| | | | 711/103 |
| 2014/0195725 A1 | 7/2014 | Bennett | |
| 2014/0244901 A1* | 8/2014 | Panda | G06F 12/0246 |
| | | | 711/103 |
| 2014/0258588 A1 | 9/2014 | Tomlin et al. | |
| 2014/0310574 A1 | 10/2014 | Yu et al. | |
| 2015/0193339 A1* | 7/2015 | Kim | G06F 12/0246 |
| | | | 711/103 |
| 2015/0347026 A1* | 12/2015 | Thomas | G06F 3/0611 |
| | | | 711/103 |
| 2017/0139627 A1* | 5/2017 | Lee | G06F 3/0626 |
| 2017/0160989 A1* | 6/2017 | Hsieh | G06F 3/061 |

* cited by examiner

SUPPORTING INVALIDATION COMMANDS FOR NON-VOLATILE MEMORY

CROSS-REFERENCES TO RELATED APPLICATIONS

This application is a non-provisional application and claims the benefit and priority of U.S. Provisional Application No. 62/213,228, filed on Sep. 2, 2015, titled "A TECHNIQUE FOR SUPPORTING TRIM COMMAND IN SPOR," which is herein incorporated by reference in its entirety for all purposes.

FIELD

The present invention relates generally to systems, methods and apparatus for storage devices, and specifically to improving performance of non-volatile memory devices.

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' (for example, NAND and NOR flash devices), are used in media storage, cameras, mobile phones, mobile computers, laptop computers, USB flash drives, etc. Non-volatile memory provides a relatively reliable, compact, cost-effective, and easily accessible method of storing data when the power is off.

Flash memory controllers are used to manage the data stored in the non-volatile memory, and to act as an interface between a host and the non-volatile memory. A flash memory controller can include a Flash Translation Layer (FTL) that maps the host side logical addresses such as "logical block addresses (LBAs)" to the flash memory side "physical addresses" which correspond to physical locations. The mapping between the logical addresses and the physical addresses can change during operating of the system for various reasons including flash management. During operation, the FTL may maintain the tables that enable the translation in volatile memory, such as Dynamic Radom Accessible Memory (DRAM), inside or accessible to the controller.

SUMMARY

Embodiments of the invention pertain to methods, systems, and computer-readable instructions for tracking commands. Methods comprise maintaining a meta page in a volatile memory to track commands. Such a meta page can comprise information associated with a non-volatile memory superblock. The superblock can comprise a plurality of physical pages. The method can further comprise receiving an invalidation command for a first logical address, the invalidation command indicating that data associated with the first logical address is invalid. The method can further comprise storing the first logical address along with an indication that the data associated with the first logical address is invalid, in a first location in the meta page. In embodiments, an index of the first location can be usable to determine the physical page corresponding to the logical address.

In some embodiments, the determining the physical page corresponding to the logical address can comprise determining a number of locations with indices lesser than the index of the first location that have indications that data associated with logical addresses they store is invalid. In some embodiments, the indication that the data associated with the first logical address is invalid includes using unused values of allowable logical addresses.

In some embodiments, the indication that the data associated with the first logical address is invalid includes using an indicator bit of the first location. Such an indicator bit can be a sign bit, and a negative sign can imply that that the data associated with the first logical address is invalid. In some embodiments, the index of the first location can be further usable to determine a position of the invalidation command in a sequence of commands.

In some embodiments, a plurality of physical pages in a superblock can comprise meta data. In some such embodiments, methods can indicate in a last physical page of the superblock comprising meta data, the locations and total number of physical pages comprising meta data. In some embodiments, methods can indicate in a physical page comprising meta data, the location of a previous physical page comprising meta data.

In some embodiments, methods can include detecting a triggering of a transfer event; and transferring contents of the meta page to a non-volatile memory. The transfer event can be, for example, least one of: a filled meta page, or a power loss occurrence. In some such embodiments, methods can comprise including an end-of-page indicator in the meta page where the triggering event is a power loss occurrence. In some embodiments, the triggering event can be a closing of the block.

Some embodiments are directed to a non-volatile memory controller comprising one or more processors configured to implement various methods. Other embodiments are directed to a computer readable medium having stored thereon instructions that when executed by a processor perform several processes.

DETAILED DESCRIPTION

Figure 1:
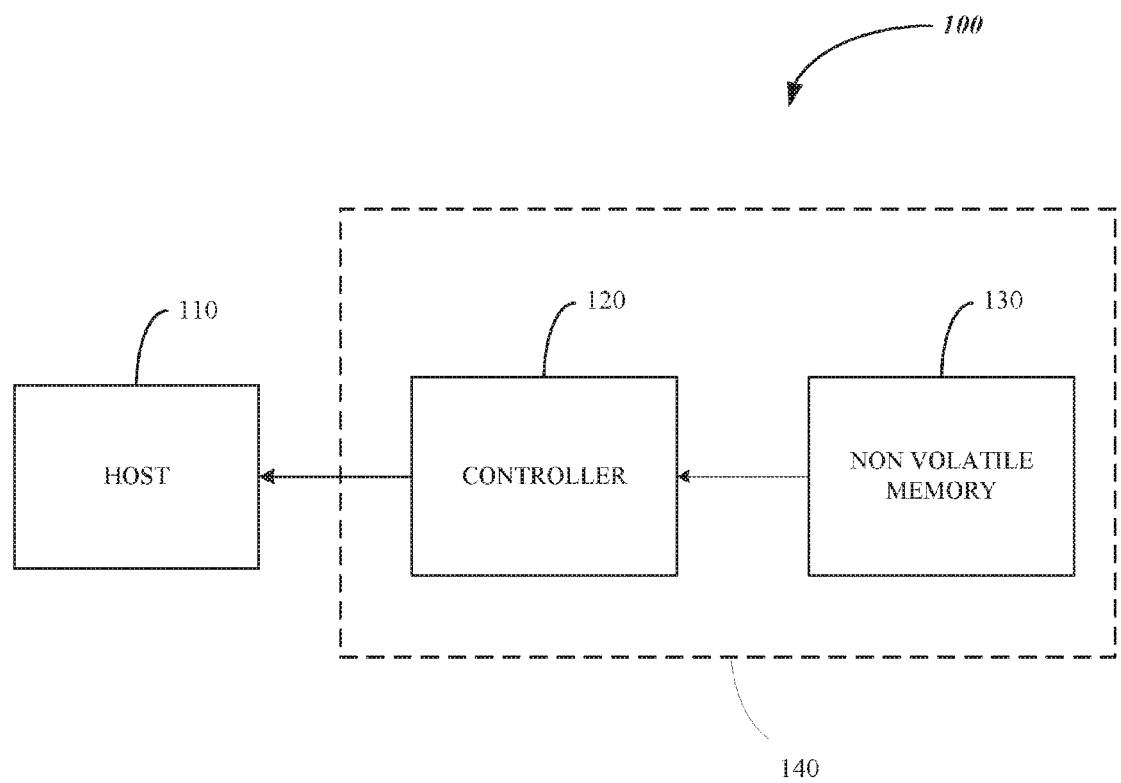
FIG. 1 is a block diagram illustrating a system including a host, a controller, and a non-volatile memory according to embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Over time, a host system may request deletion of certain data stored on the non-volatile memory. Such deletion requests may result in invalidation commands from the host system to the non-volatile storage device for specific logical addresses or Logical Block Addresses (LBA). These invalidation commands are intended to mark the data stored at these LBA's as invalid. However, in practice, the data corresponding to that LBA may not be physically erased—the LBA may be simply marked as invalid. If the data in the physical address corresponding to the invalid LBA is subsequently read, it can contain data previously present. Returning previously erased data can be undesirable, or may not meet specifications because it may pose a security threat in a number of situations.

Certain aspects of the disclosure, provide robust techniques for tracking invalidated data. For example, a memory system interacting with the host tracks locations of those LBAs marked as invalid, enabling the memory system to return either specific data (e.g., all zeros or all ones) or random data (based on the requirement) when a read operation is subsequently performed on an invalid LBA. In example approaches described further below, a flash memory controller communicating with a non-volatile memory and the host, can help store LBAs of invalid locations in the non-volatile memory itself, in meta pages. This information stored in meta pages can be used to build or rebuild a mapping table, and subsequently satisfy requirements as to what data should be read out of invalid locations.

Figure 3:
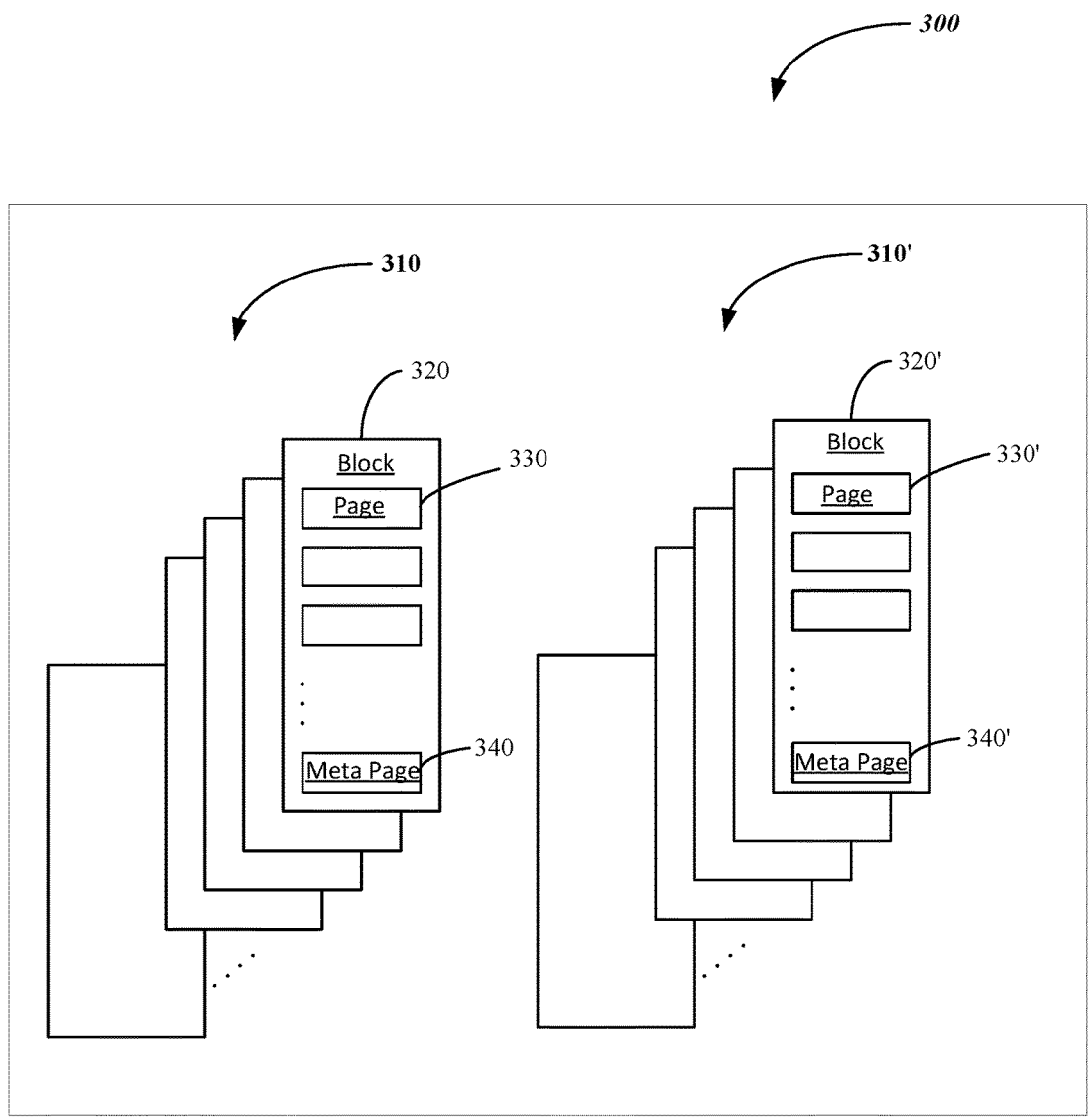
FIG. 3 is a simplified illustration of the organization of an example non-volatile memory die, according to embodiments.
Figure 4A:
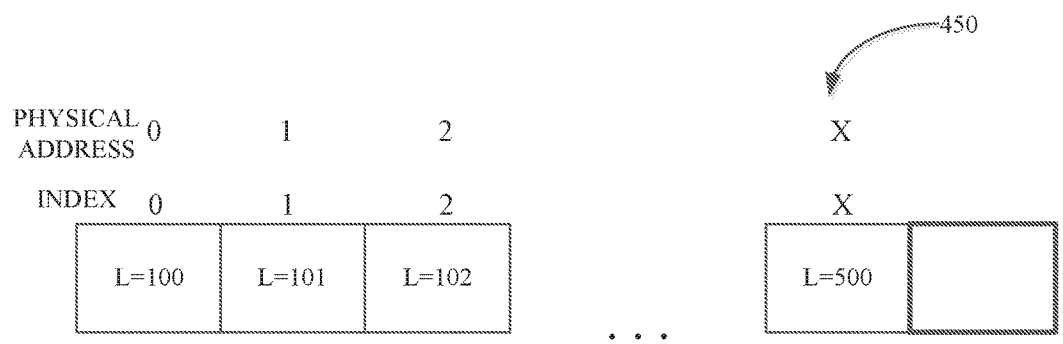
FIG. 4A is an illustration of a meta page that does not include indications of trim locations.
Figure 4B:
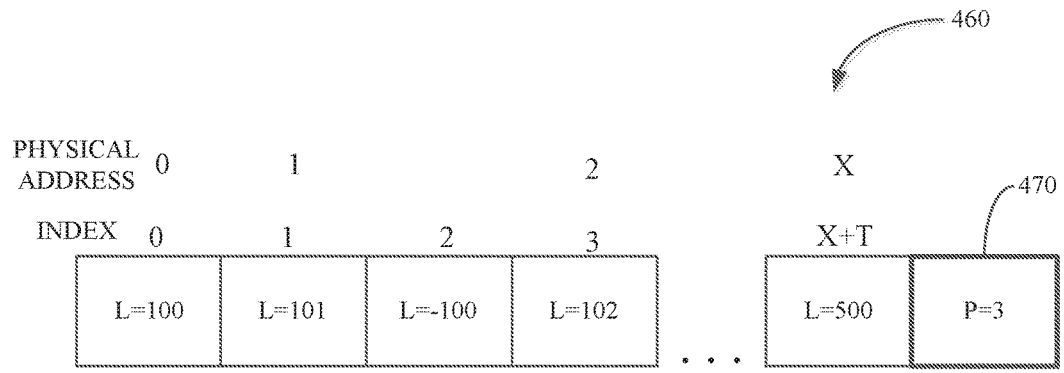
FIG. 4B is an illustration of a meta page that includes indications of trim locations, according to embodiments.
Figure 5:
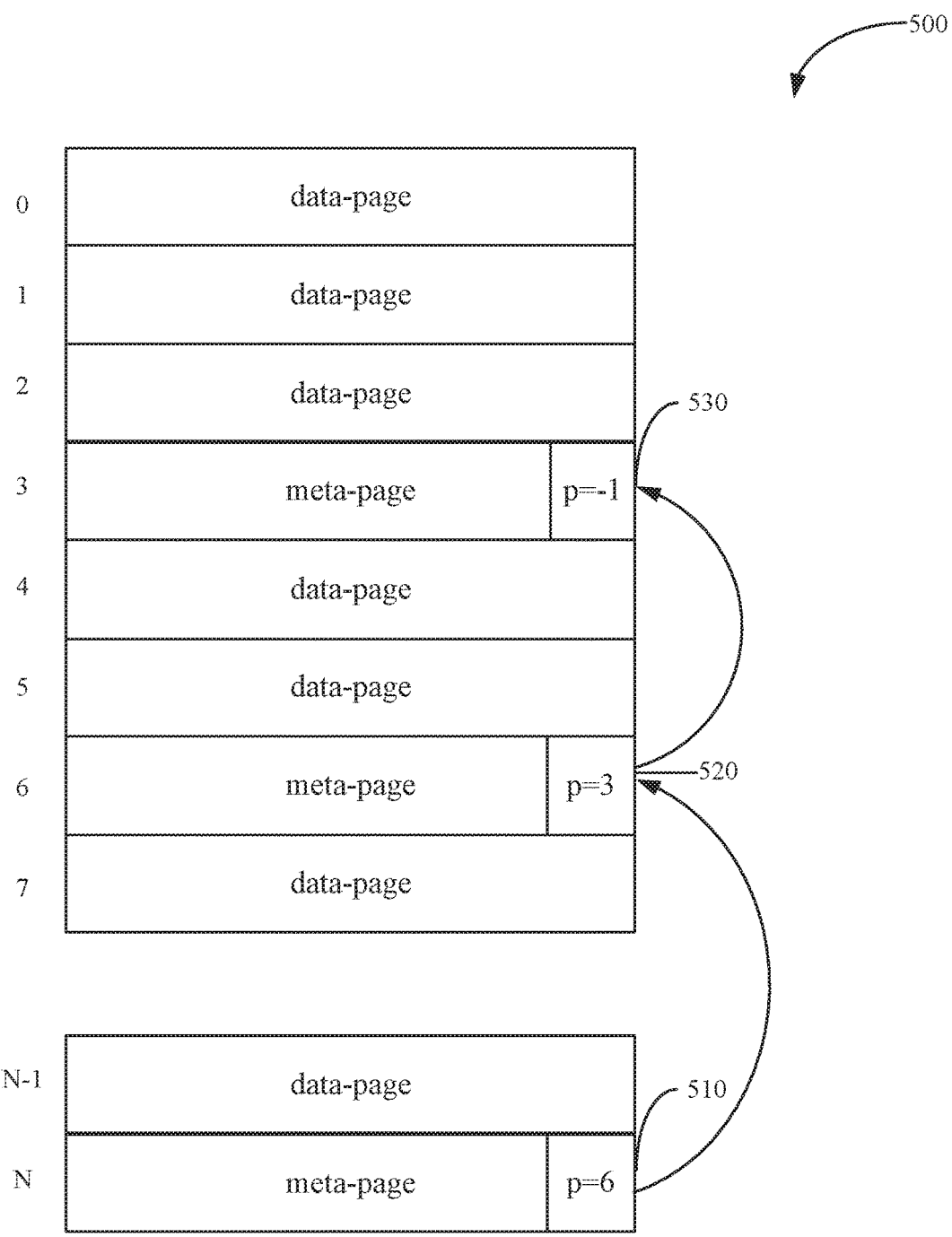
FIG. 5 is a simplified illustration of the structure of a block, including a plurality of meta pages, according to embodiments.
Figure 6:
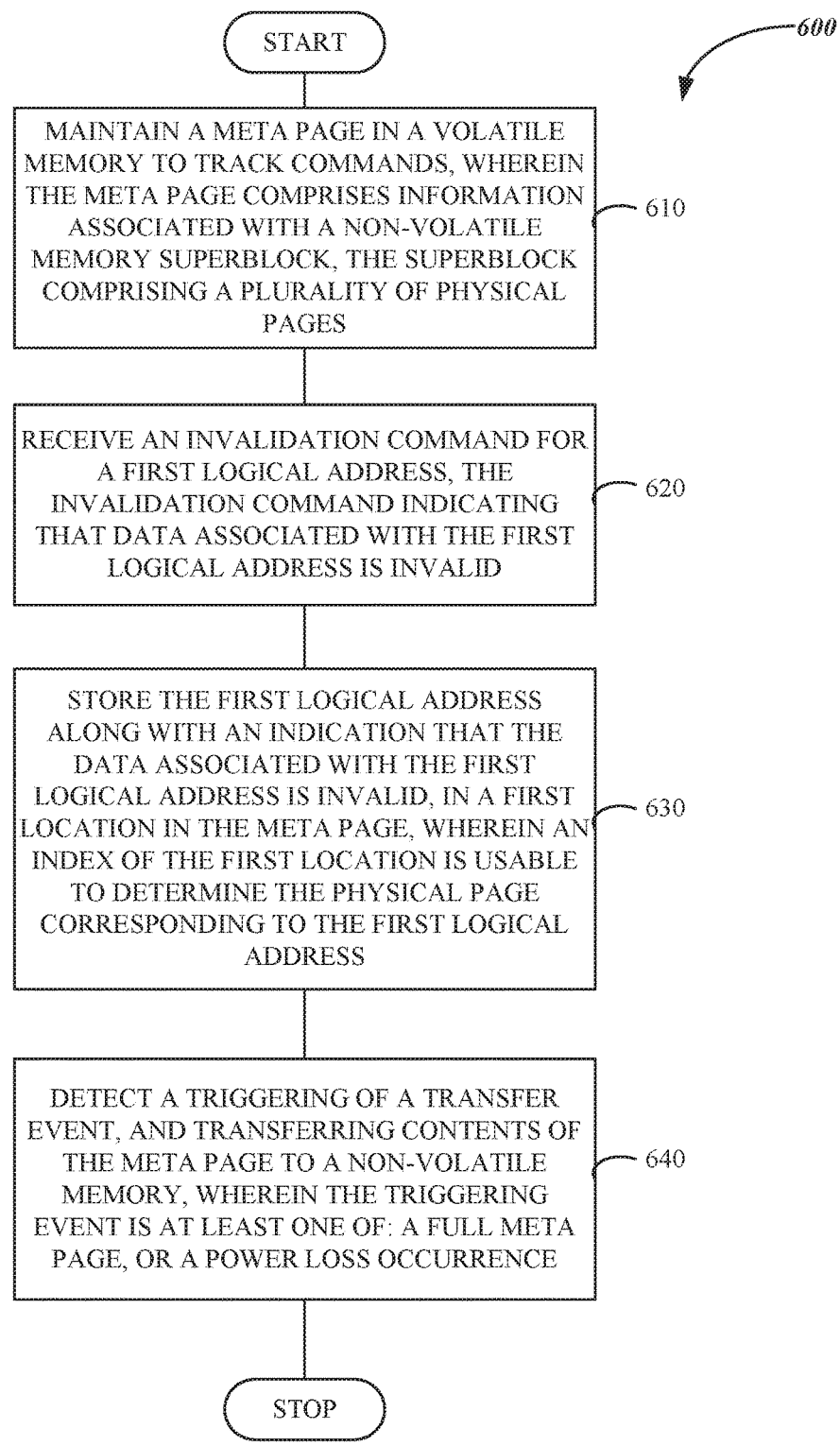
FIG. 6 is a flowchart illustrating a process performed by a controller, according to embodiments.
Figure 7:
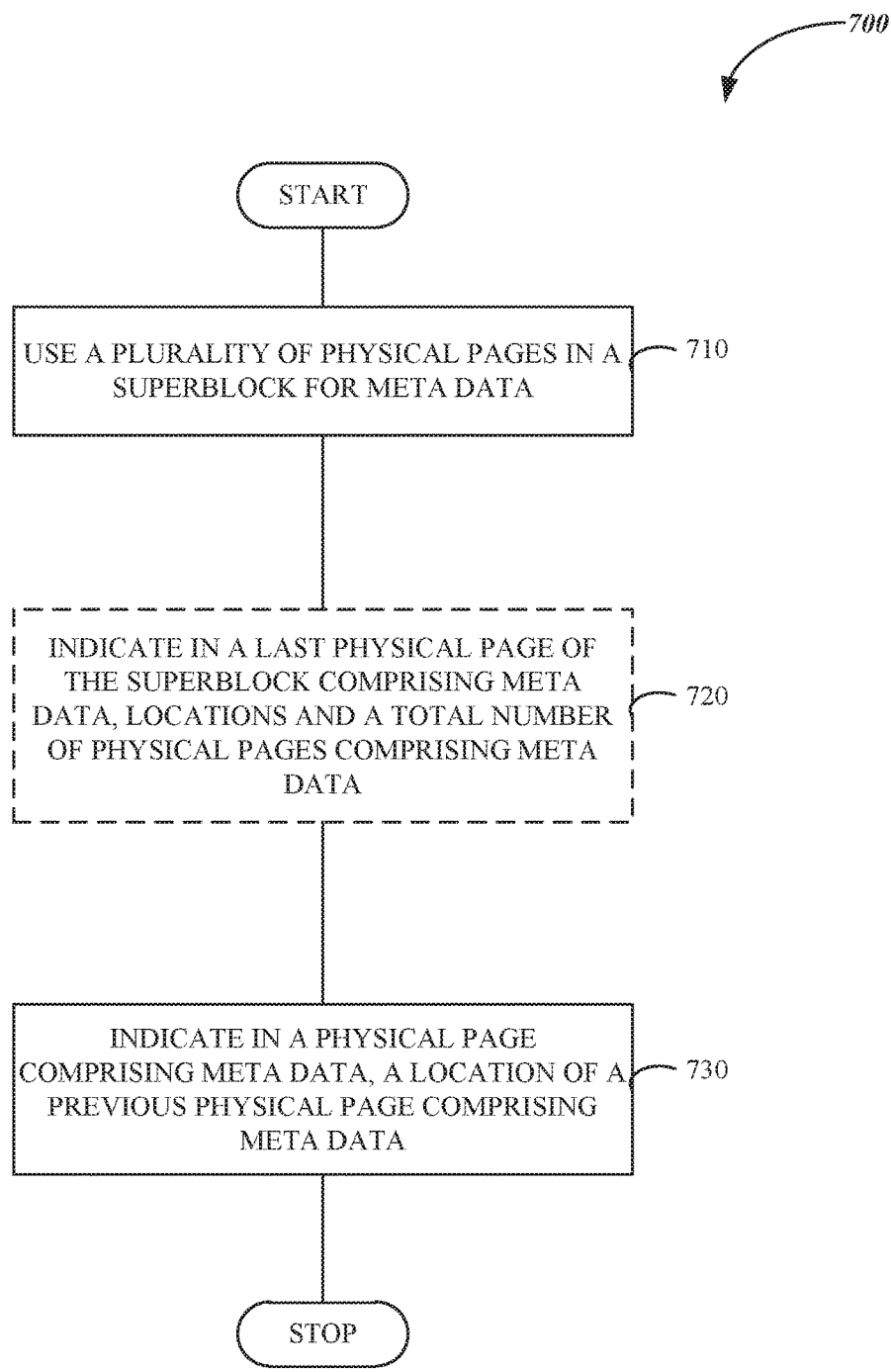
FIG. 7 is a flowchart illustrating another process, according to embodiments.
Figure 8:
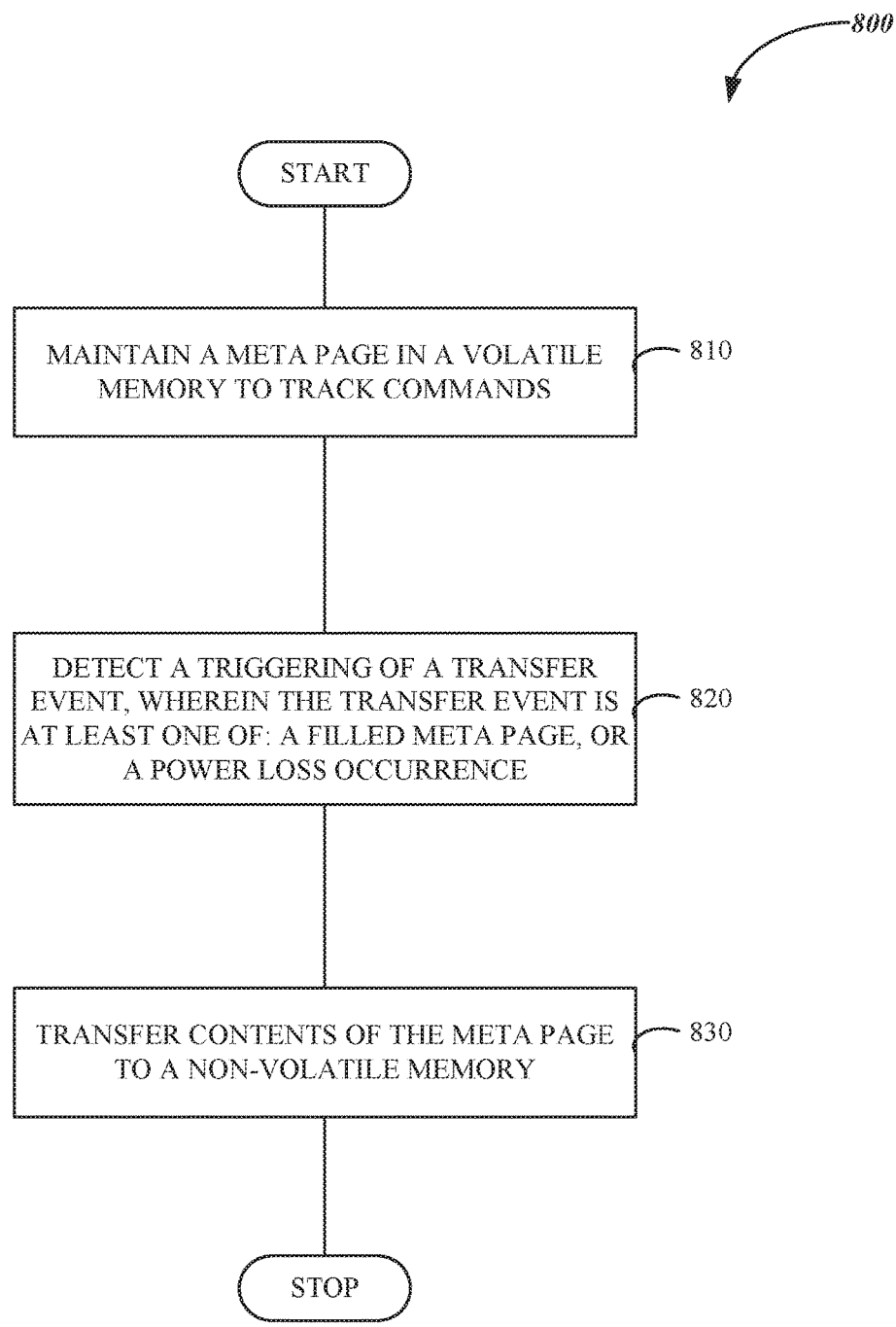
FIG. 8 is a flowchart illustrating another process, according to embodiments.
Figure 9:
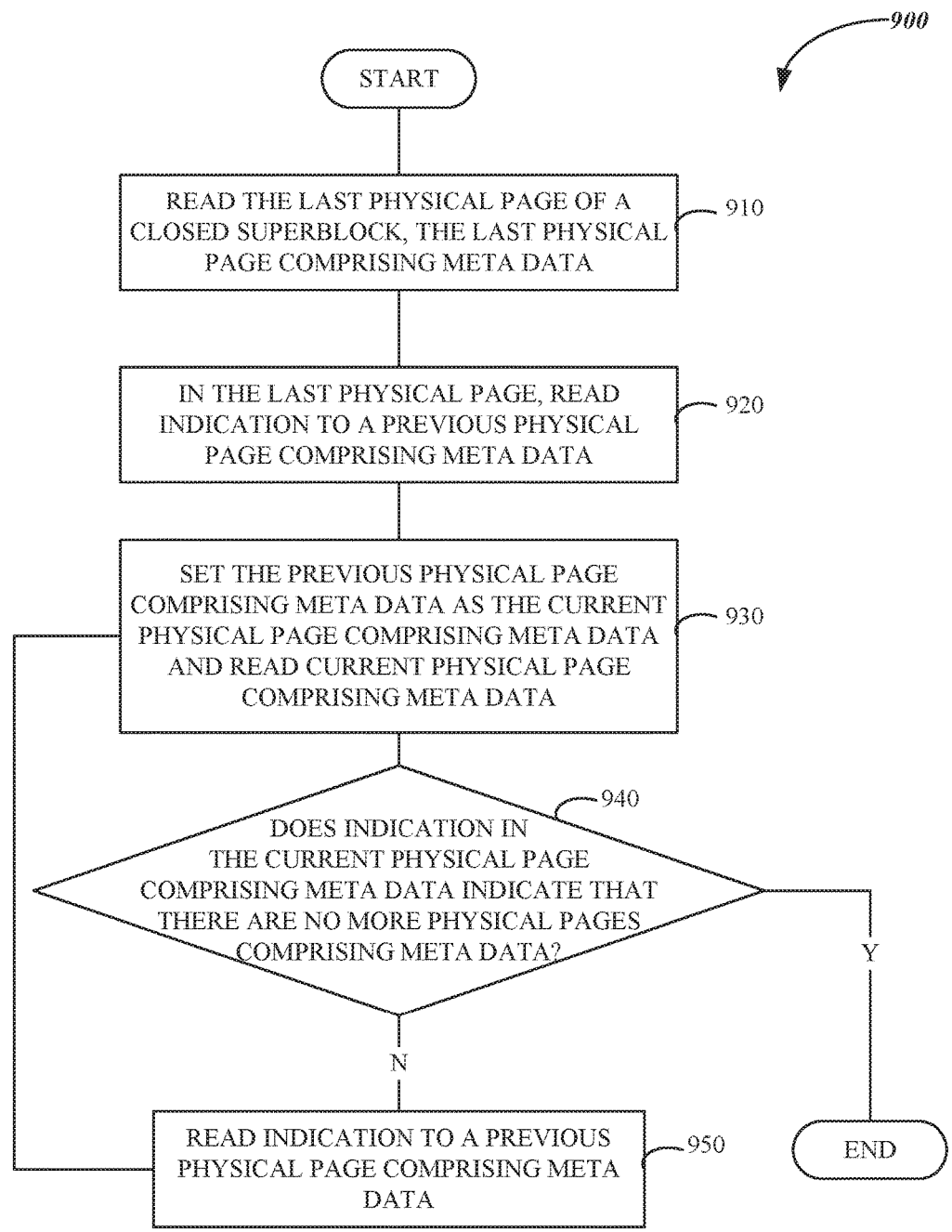
FIG. 9 is a flowchart illustrating a recovery process, according to embodiments.
Figure 10:
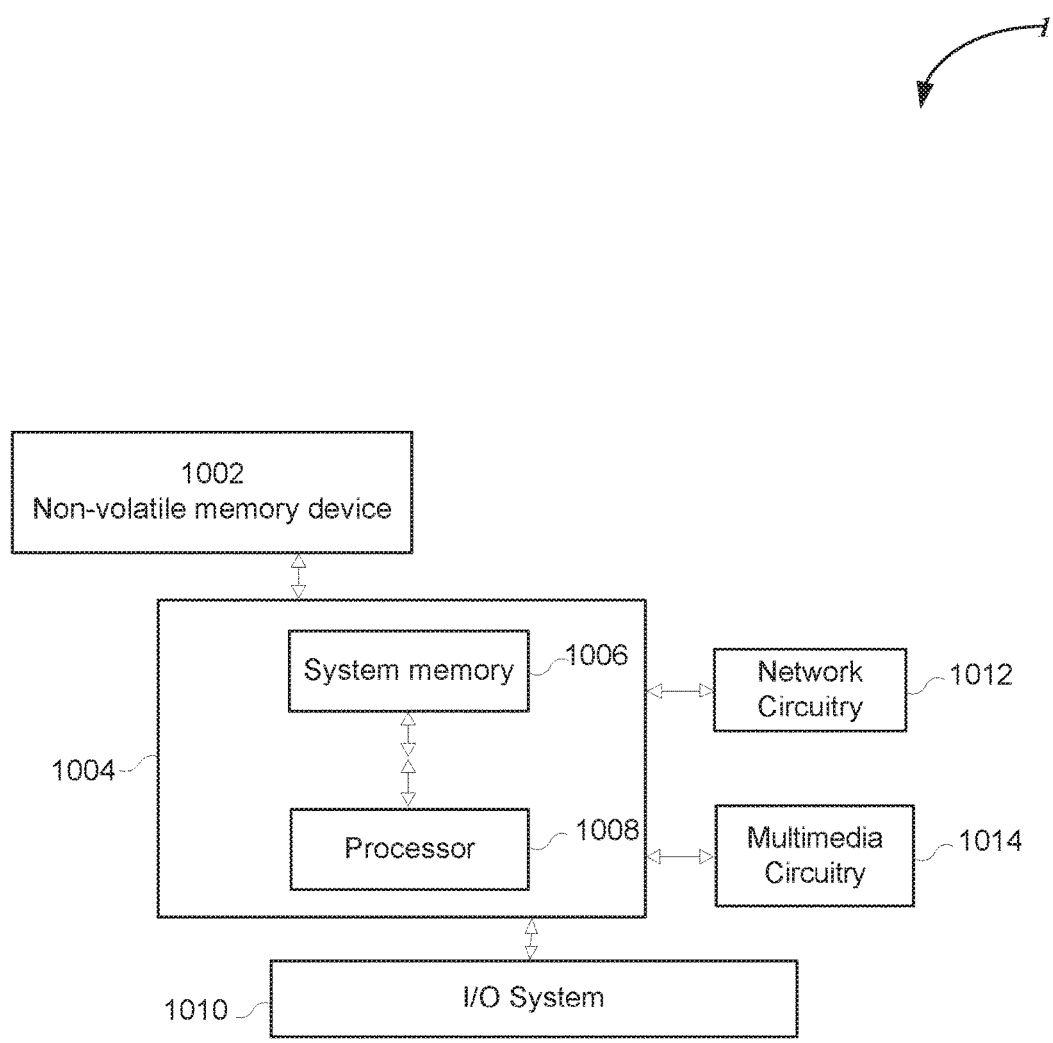
FIG. 10 is a simplified illustration of a host computer device comprising an embodiment.

FIG. 1 describes the general high level architecture of a system comprising a host, a controller, and a non-volatile memory. FIG. 2 and FIG. 3 describe examples of the structures of a controller and a non-volatile memory. FIG. 4A illustrates a meta page that does not include tracking of invalidation commands, while FIG. 4B illustrates a meta page that tracks invalidation commands, including their history. FIG. 5 illustrates a scenario where more than one meta page is used per block/superblock, with pointers to locations of the meta pages. FIG. 6, FIG. 7, and FIG. 8 illustrate three processes according to certain embodiments. FIG. 9 describes a recovery process to rebuild an FTL mapping table upon power up. FIG. 10 illustrates an example computing device that incorporates embodiments.

FIG. 1 is a simplified block diagram illustrating a system 100 including a host 110, a controller 120, and a non-volatile memory 130, according to embodiments. In some implementations, the non-volatile memory 130 can be a NAND flash memory. In other implementations, non-volatile memory 130 can be a NOR flash memory configured to interact externally as a NAND flash memory. In embodiments, non-volatile memory 130 can be designed to store data in the absence of a continuous or substantially continuous external power supply. In some examples, non-volatile memory 130 can be used for secondary data storage, for example, in a computer system such as a laptop. In such examples, a non-volatile memory system 140 can replace a hard disk drive (HDD). In some examples, controller 120 can be external to non-volatile memory system 140. In some such examples, controller 120 can interact with a plurality of non-volatile memories. The architecture and organization of one example non-volatile memory will be provided later in the specification. Other examples of the non-volatile memory can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In embodiments, controller 120 can interface between host 110 and non-volatile memory 130. Controller 120 can be configured to receive various commands from host 110 and interface with non-volatile memory 130 based on these commands. An example controller will be explained further below with reference to FIG. 2.

Figure 2A:
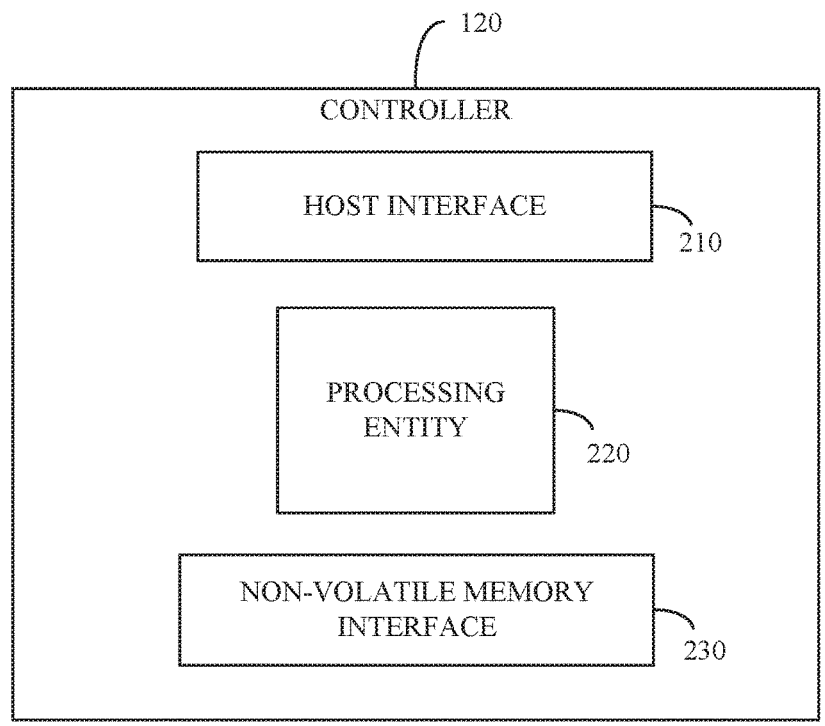
FIG. 2A and FIG. 2B are a block diagrams depicting components of example controllers, according to embodiments.
Figure 2B:
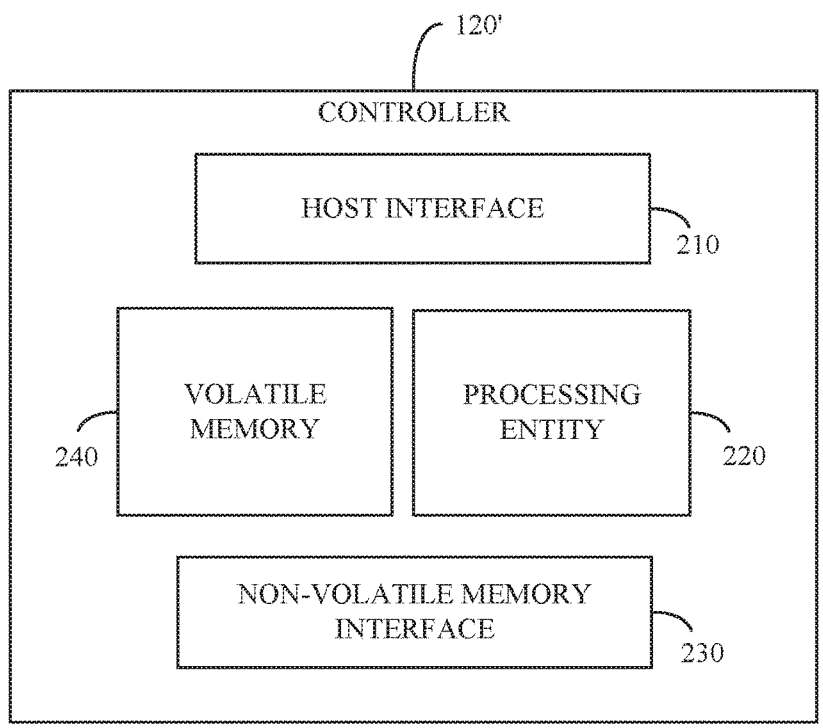

FIG. 2A and FIG. 2B are are block diagrams depicting components of example controllers 120 and 120', respectively, according to embodiments. As shown, controller 120 and 120' can comprise a host interface 210, one or more processing entities 220, and a non-volatile memory interface 230. Processing entity may refer to any processing logic, including but not limited to a processor or processing core associated with a processor, Application Specific Integrated Circuit (ASIC), Field Programmable Gate Array (FPGA), or any other circuitry configurable to execute instructions. As shown in FIG. 2B, controller 120' further comprises a volatile memory 140. For example, volatile memory 140 can include DRAM. In other examples, volatile memory 140 can include a Double Data Rate DRAM (DDR DRAM) or a Static RAM (SRAM). In general, the volatile memory can refer to any memory media where the stored data is lost in the absence of continuous or substantially continuous power supply.

In some embodiments, in addition to or instead of an internal volatile memory, controller 120 or 120' can interface with an external volatile memory. For example, controller 120 can have access to an external DRAM where data can be stored before being transferred to a non-volatile memory. Controller 120 or 120' can maintain data in the volatile memory and then transfer the data to the non-volatile memory upon triggering of a transfer event. Further description below referring to controller 120 of FIG. 2A can be applicable to controller 120' of FIG. 2B as well.

Returning to FIG. 1, in some embodiments, controller 120 can enable non-volatile memory 130 to perform various operations based on control signals received from host 110. In examples, this can enable host 110 to program, erase, read, or trim, parts of non-volatile memory 130.

FIG. 3 is a simplified illustration of the organization of an example non-volatile memory 130, according to embodiments. In certain embodiments, the structure of a volatile memory interacting with the controller can be similar to the structure of a part of the non-volatile memory. In other words, pages (such as pages holding meta data, or meta pages) can be maintained in a volatile memory before being transferred to pages of the non-volatile memory. It is to be noted that the structure shown in FIG. 3 is for illustrative purposes only and the actual physical organization of the non-volatile memory can differ substantially from the depiction.

In the example shown in FIG. 3, non-volatile memory die 300 comprises two planes 310 and 310'. Other examples can include a different number of planes per die. A plurality of such dies can be included in a non-volatile memory, such as non-volatile memory 130. Plane 310 can comprise a plurality of blocks, such as block 320. Block 320 can further comprise a plurality of pages 330. Of these pages, one or more pages can be used to store meta data. Such pages can be referred to as "meta pages." Meta page 340 is an example of a page storing meta data in block 320. A page, such as page 330 can represent a minimum programmable unit. A page can also represent the minimum readable unit.

Dies such as non-volatile memory die 300 can be organized using different channels. Each channel can have multiple dies attached to it. For example, the first block from the first die, the first block from the second die, the first block from the third die, and so on, can be grouped together and accessed in parallel, thereby forming a superblock. Pages belonging to the same superblock can be, for example, programmed and read in parallel. Although a superblock may not be physically grouped in a unit, logically, a superblock can behave as a block.

Controller 120 and '120 of the FIG. 1, FIG. 2A and FIG. 2B may execute a Flash Translation Layer (FTL) as a software layer, and may include one or more mapping tables that can be used to track physical addresses for corresponding logical addresses. Controller 120 (in embodiments more specifically the processing entity 220) is configured to execute the FTL to facilitate accesses to the non-volatile memory. The FTL maintains the mapping tables used in translating logical addresses to physical addresses. The mapping tables are maintained, in at least one embodiment, in the volatile memory 240 maintained by the controller. In examples, the logical address can be a Logical Block Address (LBA) and the physical address can correspond to a physical location or coordinate in a non-volatile memory. The FTL can serve the purpose of making the SSD function like a Hard Drive/Hard Disk Drive (HDD) by making it compatible with a traditional host interface for hard disks. In examples, the mapping tables maintained by the FTL can be of significant size, for example $\frac{1}{1000}^{th}$ the capacity of the non-volatile memory, and hence consume significant resources. In certain aspects, the mapping tables maintained by the FTL may also be referred to as FTL mapping tables or merely FTL tables.

The FTL maintains a mapping table that can reside in a volatile memory, such as a DRAM inside controller 120 or at a location that controller 120 has access to, during operation. Mappings between physical and logical addresses can change during operation. Up-to-date mapping has to be tracked and regenerated on power-on. For example, when sudden power off occurs, there may not be enough time or available power to write the entire mapping table into the non-volatile memory for future recovery. Recovering an updated mapping table at the next power-on can be referred to as the Sudden Power Off Recovery (SPOR). In particular, one issue is the recovery of logical addresses marked invalid by means of invalidation commands such as 'trim' commands.

Non-volatile memory 130 may not support in-place update of data. In other words, when data of a logical address is updated or rewritten, the corresponding physical location may not be updated. On the update, the new data can be written in a different physical location, and the mapping of the logical address can now be updated to correspond to the new physical location. This can lead to a an updated mapping in the mapping table.

The mapping table maintained by the FTL can be page based. Physical addresses, forming the content of the table, can be arranged in order of logical addresses, such that an index of the physical address can be usable to determine the logical address.

As mentioned previously, the mapping tables can be maintained in the controller. However, if there is a power loss during operation, there may not be sufficient time or energy to write updated mapping tables to the non-volatile memory for use at next power on. To help the controller rebuild an updated mapping table to supersede a 'dirty' mapping table, another type of mapping is stored in the meta blocks of the non-volatile memory itself. This is a Physical to Logical (PTL) mapping, also hereafter referred to as a PTL table to distinguish it from the (Logical to Physical) mapping table in the FTL. PTL tables can be stored in the non-volatile memory, and used by the controller to build an updated mapping table. A PTL table can be used to look up logical addresses of physical addresses. In such a table, physical address is used as an index, and a logical address can be looked up in the content. Examples of PTL tables will be explained further in connection with, for examples, FIGS. 4A and 4B.

PTL tables can be stored in meta pages in the non-volatile memory. In certain embodiments, meta pages can be present at the end of each block. Such meta pages in the non-volatile memory can be used in the power-on sequence to build a clean FTL mapping table in place of a "dirty table"—i.e. one that is outdated. Meta pages can be maintained in the volatile memory accessible to the controller and then written on the non-volatile memory. For example, when a superblock is full, or when a superblock is closed, contents of the meta page can be written to the superblock. A sequence number or timestamp can also be written to the non-volatile memory, such that it is possible to decipher the order in which the superblocks were closed. This sequence number can be used to decipher latest logical address locations. While rebuilding the FTL mapping table at power on, information from meta pages in the superblocks can be played back, and logical to physical mappings can be generated from the physical to logical mappings of each superblock. More information regarding recovery from meta pages will be provided later in the specification, for example in reference with FIG. 9.

In certain embodiments, controller 120 can receive commands to invalidate certain logical addresses. In other words, such commands request data in those logical addresses to be marked invalid. One example is a trim command. A trim command from a host implies that data associated with a Logical Block Address (LBA) is deleted—i.e. the host considers this data to be invalid. In practice, the data present physically in such a location need not actually be erased. Hence, if a read operation is subsequently done on a location previously marked invalid, old data may be available.

However, it is undesirable to provide actual data from locations previously marked as invalid. Providing actual data from locations marked as invalid poses a security risk, since data that was intended to be deleted is now available. In other words, if the non-volatile memory does not contain or track invalid locations, data from trimmed locations may still be readable for those physical addresses. Furthermore, there may be requirements for all trimmed data to be read out as all 1s or 0s. In other examples, trimmed data may have to be random/garbage data or other predetermined patterns.

FIG. 4A is an illustration of a meta page 450 according to certain aspects of the disclosure. In some embodiments, meta page 450 can be the last page of the superblock/block that it is part of. For example, meta page 450 can be managed and maintained by a controller in a volatile memory and transferred to a page of the non-volatile memory such as to page 340 or 340' as shown in FIG. 3. During a power-on sequence following a SPOR, meta pages of all superblocks can be read and used to update the FTL mapping table in order of time, such that newer physical addresses can 'overwrite' data present in older physical addresses for the same logical address. In other words, eventually one physical address will hold the current data corresponding to a logical address, although other physical addresses may be holding outdated data corresponding to that logical address.

Meta page 450 of FIG. 4A is shown as a one dimensional table. In other embodiments (not shown) meta page 450 can have more dimensions to store data. The index for each location of meta page 450 is shown above the corresponding entry. For example, L=100 corresponds to the "0"th location, L=101 corresponds to the "1"st location, L=102 corresponds to the "2"nd location, and so on until L=500, corresponding the "X"th location. This index (running from 0 to X) can be used to determine the physical address corresponding to the logical address which is the content of the entry.

In the example shown in FIG. 4A, for example, the physical address corresponding to the logical address L=102 can be determined using the index "2". In embodiments, an index "2" can imply that the corresponding physical address is the second address in the block. Hence, according to those embodiments, in meta page 450 shown in FIG. 4A, logical address 102 can correspond to the second physical location in the block. Similarly, logical address 101 can correspond to the first physical location in the block, logical address 100 can correspond to the location corresponding to index 0 in the block, and so on. Meta page 450 stores the physical-logical translations only for the "written" data, i.e. for the "write" commands. One or more last locations in the meta page can be used to store other data, such as pointers to other pages, as will be explained further below.

FIG. 4B is an illustration of a meta page 460 that includes indications of trim locations, according to certain embodiments. In certain embodiments, meta page 460 represents an enhanced embodiment of the meta page 450 that also includes indications for tracking trim commands. As shown, meta page 460 captures information indicating that logical address 100 has been trimmed through the sign of the logical address present in it—a negative sign indicating a trimmed location. Although not apparent from FIG. 4B, meta page 460 can also capture the history, sequence, and/or time stamp of trim commands. Capturing sequence of trim commands can be important to recover the correct up-to-date mapping table of the FTL on power on.

For example, the following two sequences lead to different mapping tables:

Event 1: LBA 100 is written to physical page 1, followed by LBA 100 is trimmed, followed by LBA 100 is written to physical page 2.

Event 2: LBA 100 is written to physical page 1, followed by LBA 100 is written to physical page 2; followed by LBA 100 is trimmed.

In event 1,LBA 100 is valid and the newest physical address is the second physical page. In event 2, LBA 100 is invalid.

Various methods can be used to include, along with the logical address, an indication that the data associated with the logical address is invalid, or has been trimmed. In other words, using such indications, trim commands can be distinguished from write commands in the meta pages. Without such an indication, write logical addresses may not be distinguishable from trim logical addresses. Embodiments of indications are provided below as examples, and one example is illustrated in meta page 460 of FIG. 4B.

In some embodiments, such as the one depicted in FIG. 4B, an extra bit, i.e. an indicator bit, can be used to distinguish write logical addresses from trim logical addresses. For example, a sign bit, used to indicate positive or negative values, can be used. A negative sign can be used to indicate that the data associated with the logical address is invalid.

In meta page 460, for example, at index 2, L=−100 (negative 100) indicates that the data in logical address 100 is invalid. Logical address 100 at index 0 indicates that logical address 100 was written to a physical page corresponding to index 0 before it was trimmed.

Because index 2 was used up to store a trim command, this has to be accounted for in reconstructing logical to physical mapping from the physical to logical mapping stored in the non-volatile memory while recovering from a sudden power off event. In other words, logical address 102 should still correspond to physical location 2 and not physical location 3, as suggested by its index. Hence, when power is on, the logical addresses in the table with a negative number, the physical address will not be incremented with the index. In meta page 460, logical address 102 will continue to correspond to physical address 2 as in meta page 450. Now, L=101 corresponds to the "1"st location, L=102 corresponds to the "2"nd location, and so on until L=500, corresponding the "X"th location, although the number of entries in meta page 460 is now X+T, where T corresponds to those entries storing trim information. Put another way, to determine the physical address corresponding to a given logical address, the number of negative logical addresses until the given logical address have to be summed and subtracted from the index of the given logical address.

Meta page 460 can also store a pointer to the location of another, such as a previous, meta page. In FIG. 4B, entry 470 comprises a pointer to another meta page. Such pointers will be discussed further below with reference to FIG. 5. Meta page 460 also tracks the order and history of trim commands, which can be replayed upon power-on, when the FTL mapping table is recreated. Because the approach in FIG. 4B may use otherwise unused space in meta page 460, there may be no significant, if any, memory overhead.

In embodiments, meta pages 450 and 460 can be temporarily maintained in a volatile memory accessible to a controller. Upon triggering of a transfer event, the contents of, for example, meta page 460 can be transferred onto a non-volatile memory, such as a NAND flash.

In some embodiments, contents of meta page 460 can be transferred to the non-volatile memory upon the closing of a block/superblock. In other embodiments, meta page 460 can be transferred to the non-volatile memory when meta page 460 is full.

When meta pages are used to track trim commands, there could be situations where not all the trim command history and sequence of an entire block or superblock can be captured in one meta page of the block/superblock because of lack of space in the meta page. For example, a large percentage of the locations in block can be trimmed by the host. In such situations, addresses of a large number of trim locations would have to be tracked. It may thus require a plurality of meta pages per block/superblock to track trim locations because not all addresses may be accommodated in one meta page. The number of meta pages per block thus becomes variable. This creates a need to indicate how many meta pages are present in a block, and the locations of such meta pages.

Although described further below with reference to storing trim commands, there could be other reasons independent of trim commands that can require multiple meta pages per block/superblock. For example, as the size of a block grows, not all of the physical to logical translation can be captured in one meta page.

FIG. 5 is a simplified illustration of the structure of a block 500, comprising N pages, including a plurality of meta pages, according to embodiments. Block 500 can be part of a superblock. Block 500 can comprise one or more data pages, labelled "data page" and a plurality of meta pages, labelled "meta-page". The meta pages 510, 520, and 530 can be similar to page 460 described previously.

In block 500, meta page 510, the "N"th page, is a meta page comprising physical to logical translations as described with reference to meta pages 450 and 460. In certain embodiments, the last page of the block is always a meta page, so that the meta page can be easily discovered. According to aspects of the disclosure, the meta pages can also include trim command indications. Meta page 510 also includes a pointer to the location of a previous meta page, in this case, meta page 520 at location 6. This pointer is shown "p=6." Although shown as the last entry in FIG. 5, in other embodiments, the pointer can be located elsewhere in meta page 510. Meta page 520 in turn includes a pointer to the location of a previous meta page, in this case meta page 530, in the third location. This chain can continue until there are no more meta pages. In FIG. 5, this occurs at meta page 530. Meta page 530 contains a pointer "p=−1" indicating that there are no more meta pages. In other embodiments, other indications can be used to indicate that there are no more meta pages.

During power on and review, the last page, always a meta page in embodiments, can be read. Based on the pointer in the last page, the previous (second-last) meta page can be read, and so on until the pointer in a meta page points to negative one, indicating that the last meta page has been reached.

In some embodiments, the total number and locations of meta pages can be stored in the last page of a superblock, which can always be a meta page, in addition to or instead of the pointer scheme described above. In such embodiments, when the FTL mapping table is built at power-on, the last page, which is a meta page can be read first to capture details about other meta pages. A general recovery method for power on will be described further below.

In some embodiments where multiple meta pages are used per block, when the data in a meta page being maintained in a volatile memory such as a DRAM is full, its contents can be transferred over to a meta page of the non-volatile memory. In other embodiments, such as in embodiments where one meta page is used per block, contents maintained in a volatile memory can be transferred to the non-volatile memory upon the closing of a block.

Using the scheme described above, multiple and a changing number of meta pages can be used per block. The scheme is also robust in that, for implementations, there will never be more meta pages than the number of pages in a block. This can be shown by means of a simple calculation using the whole logical address space. In one example, the size of an entry in a meta-page, that is the size of an entry storing a logical address can be 32-bits. Even if the entire memory device is trimmed by separate trim commands, the number of entries will be C/4 KB, where C represents the capacity of the memory device. Hence, even if every bit of the memory device is trimmed, a total of C/4 KB*32 bits are required to track the trim locations. In that example, the size of a super block is C/4000, which is greater than the number of bits needed to track trim locations. Hence, there will never be more meta pages than pages in a block.

FIG. 6 is a flowchart illustrating a process 600 performed by a controller, according to embodiments. Process 600 can be used by a controller to maintain a meta page in a volatile memory to track commands, and to transfer the contents of the meta page to a non-volatile memory.

At step 610, process 600 includes maintaining a meta page in a volatile memory to track commands. For example, a controller can maintain a meta page in a DRAM that is either inside or outside the controller. The meta page maintained in process 600 can be associated with a non-volatile memory superblock, and can eventually be transferred onto a non-volatile memory superblock. In examples, the non-volatile memory can be a NAND flash device. In examples, the NAND flash device can be operating as an SSD. The non-volatile memory superblock can comprise a plurality of physical pages. An example structure of a non-volatile memory was described previously in connection with FIG. 3.

At step 620, process 600 includes receiving an invalidation command for a first logical address, the invalidation command indicating that the data associated with the first logical address is invalid. In examples, such an invalidation command can be a trim command, and can come from a host. Other example of an invalidation commands can include delete. The logical address can be a Logical Block Address (LBA).

At step 630, process 600 includes storing the first logical address along with an indication that the data associated with the first logical address is invalid in a first location in the meta page. One example was provided in FIG. 4B with reference to meta page 460. As explained earlier, the indication that the data associated with the first logical address is invalid can be achieved for example by using a sign bit, with negative values indicating trim locations. An index of the first location can be usable to determine the physical page corresponding to the first logical address.

In embodiments, determining the physical page corresponding to the logical address can comprise determining a number of locations with indices lesser than the index of the first location that have indications that data associated with logical addresses they store is invalid. In particular, the physical address of the first logical address can be computed by counting the total number of negative address until the first location, and subtracting it from the index of the first location.

In embodiments, the index of the first location can also be usable to determine the position of the invalidation command in a sequence of commands. This historical information regarding the invalidation command can be useful while reconstructing an FTL mapping table on power on.

At step 640, process 600 includes detecting a triggering of a transfer event and transferring the contents of the meta page to a non-volatile memory. In examples, such a transfer event can be the closing of a block. In other examples, the transfer event can be the filling up of a meta page in the volatile memory. In yet other examples, the transfer event can be a power loss occurrence. When the trim locations of logical addresses are known and present in the non-volatile memory, during later read operations, specific data or garbage data can be read out depending on requirements.

FIG. 7 is a flowchart illustrating a process 700, according to embodiments. In some embodiments, multiple meta pages can be used to track physical locations of logical addresses, along with tracking trim locations. However, the application of process 700 is not limited to such embodiments. Multiple meta pages can be used per block for several other reasons, and process 700 can be used to maintain multiple meta pages per block for many applications.

At step 710, process 700 includes using a plurality of physical pages in a superblock or block for meta data. An example was provided in connection with FIG. 5. At step 720, process 700 includes indicating in a last physical page of the superblock comprising meta data, locations and total number of physical pages comprising meta data. Some embodiments can skip step 720.

At step 730, process 700 includes indicating in a physical page comprising meta data, the location of a previous physical page comprising meta data. In examples, the last physical page of a block/superblock can always comprise meta data, and hence be a meta page. In other examples, such as in sudden power off situations, the last page to be written from the volatile memory can include an end-of-page indicator to indicate that the page is not full.

In a sudden power off scenario, open blocks can pose special issues in rebuilding FTL mapping tables. An open block can refer to a block that is actively being accessed and written to. In some embodiments, a meta page maintained in a volatile memory can be written to the non-volatile memory when an open block is closed. In such embodiments, when sudden power off occurs when the block is still open, the physical to logical address mapping information may not yet be written to the non-volatile memory. At the next power-on, address mapping information can be recovered by reading through all the meta pages, along with trim command information. However, for open blocks, the trim command information cannot be recovered by scanning the data in meta pages at power-on, because the trimmed logical addresses may not be written to anywhere in the non-volatile memory.

One way to resolve this is by using a super-capacitor, which stores energy, and can be used in the event of a power loss to complete the transfer of some data from the volatile memory to the non-volatile memory. However, the size of an open block during power off can be huge with several unwritten meta pages in the volatile memory, necessitating a very expensive super-capacitor.

According to embodiments, write and trim information from the host is accumulated in the volatile memory through the controller until a meta page is full, and a full meta-page is transferred to the non-volatile memory. In other words, at any given time, there will be at most one page of data to write to the non-volatile memory even in the case of a power-loss. When a power loss happens when the meta page is not full, the partial meta page can be written aong with a end-of-page indicator in the meta page. The end-of-page indicator can provide indication that data beyond the end-of-page indicator is not valid. Such a power-loss data transfer can be accomplished with energy from a super-capacitor.

Under this approach, number and locations of the meta-pages are undetermined until the super block is closed. The controller can keep track of the number of write pages and the number of meta-pages generated during run-time. Whenever the sum of both types is equal to the size of a super block, the superblock in the non-volatile memory can be closed by writing the last meta-page. When power is turned on, after reading the last page, always a meta page, information necessary for a mapping table rebuild can be retrieved.

FIG. 8 is a flowchart illustrating a process 800, according to embodiments. Process 800 can ensure that at any given time, there will be only as much data to transfer to the non-volatile memory as can be supported by a failure-mode mechanism. For example, only so much data can be maintained in the volatile memory as can be written to the non-volatile memory in the event of a power failure. Depending on the failure-recovery mechanism (e.g. supercapacitor), this could be one meta page, or it could be limited by some other failure mode mechanism.

At step 810, process 800 includes maintaining a meta page in a volatile memory to track commands. In embodiments, step 810 can be performed by a controller interacting with a volatile memory such as a DRAM that is either internal or external to the controller. At step 820, process 800 includes detecting a triggering of a transfer event. In one example, the transfer event can be a filled meta page. In another example, the transfer event can be a sudden power off occurrence. In yet another example, the transfer event can be a fixed number of meta pages that can be written when power is lost based on the capacity of a supercapacitor. At step 830, process 800 includes transferring contents of the meta page or meta pages to a non-volatile memory.

According to some embodiments, the run-time algorithm can be as follows:
1. When a superblock is opened in the non-volatile memory (NAND flash), a meta page area is created in a volatile memory (DRAM) to accumulate host write information and trim command information.
2. Meta data in the meta page of the DRAM is set to d=[].
3. The number of meta pages is set as m=1.
4. The previous meta page location is set as p=-1.
5. When a host write command is received with the corresponding LBA '1', '1' is appended to the end of d, so that d=[d, 1] and the host write page count h is incremented by 1.
6. When a host trim command with is received with corresponding LBA '1'', '-1'' (minus 1') is appended to the end of d, so that d=[d, -1']. The host trim page count t is incremented by 1.
7. If the meta-page is full, d is appended by p (the pointer to the previous meta page), such that d =[d, p] and written to the open block. After writing, the meta-page area in the DRAM is cleared up for next round.
8. If the current physical page index is p1, p is set to p1 such that p=p1. (As mentioned previously, p is used to keep track of the location of previous meta-page).
9. In the event of a power loss, d is appended by p and an End of Page (EOP) indicator, so that d=[d, p, EOP] and written to system area of the NAND, The EOP indicates that there is no more data.
10. When h (write page count)+t (trim page count)=N (size of a super block, i.e. number of pages in the superblock), the superblock is closed. d is appended by p, so that d=[d, p] and is written to the end of the block.

During power on following the algorithm described above, in embodiments, the recovery algorithm could be as follows:

1. When power is on, meta-pages from all closed blocks and open blocks are read. When reading the meta-page from a closed block, the last page is read first, because it is a meta-page. Then according to the p value in that last page, other meta-pages can be located and read, until a meta page is reached with p=-1, indicating that there are no more meta-pages.
2. When reading the meta-page from the open block, the system area of the NAND is read, so that the p value of the last meta-page can be read. Other meta-pages from the NAND can then be read in the same way described above.
3. The meta-page information is sorted and replayed into the FTL table according to the order of oldest to newest. In this way, both the host write entries and the trimmed entries are recovered.

FIG. 9 is a flowchart illustrating a recovery process 900, according to embodiments. Process 900 can be used to recover address mapping information required to build an FTL table upon power on.

At step 910, process 900 includes reading the last physical page of a closed superblock. The last physical page of a closed block comprises meta data. At step 920, process 900 can include reading an indication to a previous physical page comprising meta data. At step 930, process 900 can include setting the previous physical page comprising meta data as the current physical page comprising meta data, and reading the current physical page comprising meta data.

At step 940, process 900 includes determining whether the last physical page comprising meta data has been reached. In examples, this indication can be through a pointer referencing a non-existent page (such as p=-1). If the last physical page comprising meta data has indeed been reached, process 900 ends. If the last physical page comprising meta data has not been reached, an indication to the previous physical page comprising meta data is read, such as through a pointer. The previous physical page comprising meta data is then set as the current physical page comprising meta data and the process continues.

One approach to track addresses that have been trimmed is to use another table similar to the FTL mapping table that "bit-maps" or keeps track of trimmed logical addresses. In some implementations, an extra bit in each entry of the FTL mapping table can be used to track the trim status. In some embodiments, the indication of whether a logical address in the FTL mapping table corresponds to a trim value can be achieved by using unused values. For example, according to the International Disk-drive Equipment and Materials Association (IDEMA) specification, there may be several forbidden values of logical addresses. These unallowed or forbidden patterns can be used to indicate logical addresses that correspond to trim commands.

FIG. 10 illustrates an example computing device 1000 comprising embodiments of the invention. Hardware elements of device 1000 can be electrically coupled via a bus (or may otherwise be in communication, as appropriate). As shown in FIG. 10, computing device 1000 includes processing unit 1004, non-volatile memory device 1002, an input/output (I/O) system 1010, network circuitry 1012, and multimedia circuitry 1014. In the example depicted, processing unit 1004 can act as a host system.

In examples, non-volatile memory device 1002 can be a NAND flash memory device and can be used to store secondary data accessed by processing unit 1004. Non-volatile memory device 1002 can include a controller (not shown) according to embodiments described above, acting as an interface between non-volatile memory device 1002, such as the non-volatile memory shown in FIG. 1 and FIG. 3 and controller shown in FIG. 2A, FIG. 2B, and FIG. 3, and the processing unit 1004. System memory 1006 can be a volatile memory such as a Random Access Memory (RAM) and can operate in conjunction with processor 1008. Processor 1008 can include, without limitation one or more general-purpose processors and/or one or more special-purpose processors (such as digital signal processing chips, graphics acceleration processors, and/or the like)

Computing device 1000 can further include network circuitry 1012 to connect computing device 1000 to a network. The network circuitry can include without limitation a modem, a network card (wireless or wired), an infrared communication device, a wireless communication device and/or chipset (such as a Bluetooth™ device, an 1602.11 device, a WiFi device, a WiMax device, cellular communication facilities, etc.), and/or the like. Network circuitry 1012 may permit data to be exchanged with a network, other devices, and/or any other devices described herein.

As shown in FIG. 10, computing device 1000 can include multimedia circuitry 1014. Multimedia circuitry 1014 can connect computing device 1000 to several external audio and video input and output, such as displays and speakers. I/O system 1010 can connect computing device 1000 to various input devices and mechanisms such as keyboards, mice, touchscreens, cameras, infra-red capture devices, and the like, and output devices and mechanisms such as a printer, a display unit, a haptic feedback device, and/or the like.

Device 1000 also can comprise software elements, located within system memory 1006 or in non-volatile memory 1002, including device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device such as controllers 120 and 120' of FIG. 2A and FIG. 2B) to perform one or more operations in accordance with the described methods, for example any of the methods illustrated in FIGS. 6, 7, 8, and 9.

A set of these instructions and/or code might be stored on a computer-readable storage medium, such as the non-volatile memory device 1002, within controller 120 or 120' described above. In some cases, the storage medium might be incorporated within a device, such as device 1000 or controller 120 or 120'. In other embodiments, the storage medium might be separate from a device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by a device and/or might take the form of source and/or installable code, which, upon compilation and/or installation on a device (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A method of tracking commands, comprising:
maintaining a meta page in a volatile memory to track commands, wherein the meta page comprises information associated with a non-volatile memory superblock, the superblock comprising a plurality of physical pages;
receiving an invalidation command for a first logical address, the invalidation command indicating that data associated with the first logical address is invalid; and
storing, based on the invalidation command, the first logical address along with an indication that the data associated with the first logical address is invalid, in a first location in the meta page, wherein an index of the first location is usable to determine the physical page corresponding to the first logical address.

2. The method of claim 1, wherein the determining the physical page corresponding to the first logical address comprises:
determining a number of locations with indices lesser than the index of the first location that have indications that data associated with logical addresses they store is invalid; and
determining a physical address of the physical page corresponding to the first logical address based on the number of locations.

3. The method of claim 1, wherein the indication that the data associated with the first logical address is invalid includes using an indicator bit of the first location, wherein the indicator bit is a sign bit, and wherein a negative sign implies that that the data associated with the first logical address is invalid.

4. The method of claim 1, wherein the index of the first location is further usable to determine a position of the invalidation command in a sequence of commands.

5. The method of claim 1, wherein a plurality of physical pages in the superblock comprise meta data.

6. The method of claim 5, further comprising indicating in a last physical page of the superblock comprising meta data, locations and a total number of physical pages comprising meta data.

7. The method of claim 5, further comprising indicating in a physical page comprising meta data, a location of a previous physical page comprising meta data.

8. The method of claim 1, further comprising:
detecting a triggering of a transfer event; and
transferring contents of the meta page to a non-volatile memory, wherein the transfer event is at least one of: a filled meta page, or a power loss occurrence.

9. The method of claim 8, further comprising including an end-of-page indicator in the meta page where the transfer event is a power loss occurrence.

10. The method of claim 8, wherein the transfer event is a closing of the superblock.

11. A non-volatile memory controller, comprising:
one or more processors configured to:
maintain a meta page in a volatile memory to track commands, wherein the meta page comprises information associated with a non-volatile memory superblock, the superblock comprising a plurality of physical pages;
receive an invalidation command for a first logical address, the invalidation command indicating that data associated with the first logical address is invalid; and
store, based on the invalidation command, the first logical address along with an indication that the data associated with the first logical address is invalid, in a first location in the meta page, wherein an index of the first location is usable to determine the physical page corresponding to the first logical address.

12. The non-volatile memory controller of claim 11, wherein the determining the physical page corresponding to the first logical address comprises:
determining a number of locations with indices lesser than the index of the first location that have indications that data associated with logical addresses they store is invalid; and
determining a physical address of the physical page corresponding to the first logical address based on the number of locations.

13. The controller of claim 11 wherein the indication that the data associated with the first logical address is invalid includes using an indicator bit of the first location, wherein the indicator bit is a sign bit, and wherein a negative sign implies that that the data associated with the first logical address is invalid.

14. The controller of claim 11, wherein the index of the first location is further usable to determine a position of the invalidation command in a sequence of commands.

15. The controller of claim 11, wherein a plurality of physical pages in the superblock comprise meta data.

16. The controller of claim 15, wherein the one or more processors are further configured to indicate in a last physical page of the superblock comprising meta data, locations and a total number of physical pages comprising meta data.

17. The controller of claim 11, wherein the one or more processors are further configured to indicate in a physical page comprising meta data, a location of a previous physical page comprising meta data.

18. The controller of claim 11 wherein the one or more processors are further configured to:
detect a triggering of a transfer event; and
transfer contents of the meta page to a non-volatile memory, wherein the transfer event is at least one of: a filled meta page, or a power loss occurrence.

19. The controller of claim 18, wherein the one or more processors are further configured to include an end-of-page indicator in the meta page where the transfer event is a power loss occurrence.

20. The controller of claim 18, wherein the transfer event is a closing of the superblock.

21. A non-transitory computer readable medium having stored thereon instructions that when executed by a processor perform a method, including:
maintaining a meta page in a volatile memory to track commands, wherein the meta page comprises information associated with a non-volatile memory superblock, the superblock comprising a plurality of physical pages;
receiving an invalidation command for a first logical address, the invalidation command indicating that data associated with the first logical address is invalid; and
storing, based on the invalidation command, the first logical address along with an indication that the data associated with the first logical address is invalid, in a first location in the meta page, wherein an index of the first location is usable to determine the physical page corresponding to the first logical address.

* * * * *